United States Patent [19]
Choi et al.

[11] 3,926,898
[45] Dec. 16, 1975

[54] PIGMENTED PRIMER COMPOSITION

[75] Inventors: Jae Hong Choi, Dayton; Stephen Allen Miller, Fairborn, both of Ohio

[73] Assignee: DAP, Inc., Dayton, Ohio

[22] Filed: Nov. 28, 1973

[21] Appl. No.: 419,758

[52] U.S. Cl............ 260/33.4 R; 260/40 R; 427/407; 427/408; 428/480
[51] Int. Cl.$^2$.. C08K 5/05; C08K 3/22; C08L 67/00
[58] Field of Search...... 260/33.4 R, 40 R; 117/148, 117/72; 427/407, 408; 428/480

[56] References Cited
UNITED STATES PATENTS
3,652,502   3/1972   Jackson et al. ..................... 117/148
FOREIGN PATENTS OR APPLICATIONS
794,434   9/1968   Canada ................................ 260/77

*Primary Examiner*—Allan Lieberman
*Attorney, Agent, or Firm*—Bruce M. Eisen; Stephen B. Coan

[57] ABSTRACT

This invention relates to a pigmented primer composition for preparing surfaces for finish coating. The primer composition has a pH of about 3 to 6.5 and comprises a dispersion of pigments in an alcoholic solution of a synthetic resin of a modified polyester type. The preferred resin is prepared by the reaction of trimellitic anhydride, isophthalic acid, a glycol having 3 to 6 carbon atoms and an alkanol having 6 to 16 carbon atoms, and is characterized by an acid number of about 190 to 210. The pigments represent 5 to 60 percent by weight of the primer composition.

20 Claims, No Drawings

PIGMENTED PRIMER COMPOSITION

The present invention provides a novel, superior primer composition that is stable, easy to apply, effective in covering stains, and requires relatively small quantities to cover porous surfaces. Furthermore, it does not allow bleedthrough upon the later application of finish coating materials such as oil- and water-based paints, enamels and lacquers.

Briefly stated, this pigmented primer composition comprises a dispersion of pigments in an alcoholic solution of a hereinafter specified synthetic resin of a modified polyester type. The resin is the reaction product of trimellitic anhydride and isophthalic acid with certain glycols and alkanols.

Another aspect of the invention can be considered to reside in the method of finishing a porous surface by application of a thin coating of this composition; drying the applied primer composition, and then applying a topcoat or finishing coat.

Suitable surfaces for finishing according to the method of this invention include wood, plaster, insulating board and wallboard. This composition will seal such porous surfaces as well as "prime" them and thus could be considered a primer-sealer. As well-recognized in the art, such compositions generally are thin coatings which spread and adhere well to the substrate, and which eliminate irregularities in surface texture or in composition of the original substrate so as to promote better adhesive binding to subsequently applied layers of coatings.

The alcohol-soluble resin products employed in the present invention may be prepared in the manner described in Humburger et al. Canadian Pat. No. 794,434, issued Sept. 10, 1968. The patentees teach that certain broad classes of resins are useful as protective colloids in polymer emulsions and leveling agents in liquid floor polishes, thereby enabling these resins to substitute for shellac for such uses. We have found, in essence, that a relatively narrow subclass of the resins generically described therein afford excellent pigmented primer compositions.

The Humburger et al. resin products are taught to be prepared by the reaction at elevated temperatures of a polycarboxylic acid having an average of more than 2 and up to 4 carboxy groups per molecule, with a polyhydric alcohol having an average of not more than 3 hydroxyl groups per molecule of alcohol, and an alkanol having 6 to 16 carbon atoms, the reactants being in such proportions as to form a resin product characterized by the desired acid number and by being soluble in dilute aqueous alkali. The molecular ratio of polycarboxylic acid to glycol is advantageously in the order of between 1.5:1 and 1:1 with the alkanol being present in such an amount as to provide the desired acid number of the resin product.

In preparing the preferred resin for use in the composition of this invention, a mixture of trimellitic anhydride and isophthalic acid is employed as the polycarboxylic acid monomeric components. Four to eight moles of trimellitic anhydride should be employed per mole of isophthalic acid. Similarly, the glycols used should be those with 3 to 6 carbon atoms. 2,2-dimethyl-propane-1,3-diol is the preferred glycol herein. The glycol is used in an amount of 0.7 to 1.2 moles per mole of trimellitic anhydride.

Tridecanols are a preferred class of alkanols for use in forming the resin base of the present invention. Commercial cogeneric mixtures of tridecanols are suitable and are readily available via such large-scale industrial processes as the "oxo" process (using, for example, propylene tetramer as the feedstock). Other alkanols, e.g. isodecyl alcohol, can also be used in the same manner. The alkanol is employed in the reaction mixture in an amount sufficient to impart an acid number of about 190 to 210. This amount can be calculated from any given mixture of polycarboxylic acid monomeric components and glycol.

The resins of this invention can be prepared in a manner similar to that described in Humburger et al. and particularly Examples 9 and 10 thereof. The isophthalic acid and glycol are loaded into the reactor and heated to about 185° to 205°C until the reaction mixture becomes clear. The trimellitic anhydride is added and the mixture heated at about 200° for about an hour. The tridecanol is then added and the reaction mixture heated at about 200°–210° until an acid number of about 200 (190–210) is reached. The resin is then poured into a tray and allowed to cool. To prepare a kilogram of one such exemplary resin, one could use about 585 grams of trimellitic anhydride, 89 grams of isophthalic acid, 312 grams of 2,2-dimethylpropane-1,3-diol and 74 grams of tridecanol.

The preferred primer compositions of this invention can be considered to comprise a thermoplastic polyester resin characterized physically by a melting point in the range of 100°–120°C, a viscosity in 35 percent ammoniacal solution of about 30–50 cps, solubility at alkaline pH, solubility in lower alkanols having 1 to 4 carbon atoms and characterized chemically as a high-temperature polymerization product of trimellitic anhydride and isophthalic acid in a molar ratio of about 4–8 to 1; a glycol having 3 to 6 carbon atoms in an amount of 0.7 to 1.2 moles per mole of trimellitic anhydride and an alkanol having 6 to 16 carbon atoms in an amount sufficient to impart to the resin an acid number of about 190–210; dissolved in a lower alkanol having 1 to 4 carbon atoms, the weight ratio of such lower alkanol to said polymer being in the range of 0.5–4 to 1, and having dispersed therein 5 to 60 percent by weight of at least one pigment; the pH of said composition being in the range of 3 to 6.5.

The lower alkanols which serve as the volatile vehicle portion of the inventive primer compositions comprise methanol, ethanol, propanol, isopropanol, 1-butanol, 2-butanol, 2-methyl-1-propanol and 2-methyl-2-propanol. The preferred lower alkanol herein is ethanol.

As used in the paint and allied arts, the term "pigment" means those dry, insoluble substances, usually pulverized, which are suspended in the liquid vehicle to impart the desired degree or type of color, glossiness, leveling opacity, and similar characteristics. Commonly included among the prime pigments for coloration are various titanium, antimony and zinc compounds. A preferred pigment for use in the primer composition of this invention is titanium dioxide to impart a white coloration.

These coloration pigments are generally used in combination with extender pigments. The term "extender pigments" is used to denote transparent white to colorless pigments which contribute little to opacity, but because of their comparatively large particle size and random structure, hold the film together and reduce cracking tendencies. Extender pigments are also used to control the pigment-volume concentration. A common extender pigment is talc (magnesium silicate). Others include calcium carbonate, silica, clay and mica.

In preferred primer compositions of this invention, the pigment portion comprises 24 to 44 percent by weight of the total composition. In a specifically preferred embodiment of this invention, the pigment comprises titanium dioxide and magnesium silicate in a weight ratio of 3:1 to 1:1, thereby yielding a composition demonstrating a desirable level of whiteness and opacity. Lecithin is also advantageously included as a grinding aid.

The following example illustrates the preparation of a preferred composition of this invention in the form of a flat white primer-sealer.

EXAMPLE 534 pounds of the preferred resin described above (available commercially as Isoclear SW-1248 Trimellitic Anhydride Resin, from Schenectady Chemicals, Inc., Schenectady, New York) is mixed with 940 pounds of ethanol. The resin has an elemental carbon content of about 62 percent by weight and a hydrogen content of about 6 percent by weight. To this resin solution is then added 684 pounds of titanium dioxide, 278 pounds of talc and 9 pounds of lecithin (a milling aid) and the mixture is sent to a ball mill.

The mixture is milled for four hours and then pumped into the mixing tank. An additional 53 gallons of ethanol are then loaded into the mill to rinse. The mill is operated for three minutes. The rinse solution is then pumped into the mixing tank with the original batch whereupon the original batch and rinse are thoroughly admixed. The final composition has a pigment content of 34 percent and a pH of 4.5 and a polyester resin content of 19 percent and an ethanol content of 47 percent. The weight ratio of alkanol to resin is about 2.4.

This composition can be applied (by brush, roller, sprayer or the like) onto the surface to be primed, e.g. plywood, and covers a greater area than an equivalent amount of shellac-based primer. The primed surface is then dried, typically by merely air-drying which requires a comparatively short time, e.g. about one hour. The resultant primer film is resistant to blistering, cracking, checking and bleed-through. Then a finishing coat of paint, lacquer, enamel or the like is applied in the conventional manner. This finish coat or topcoat is generally decorative, providing color and luster.

In place of the resin described in the Example, one can employ other resins, for example, one based on trimellitic anhydride, isophthalic acid, propylene glycol and isodecyl alcohol in an analogous fashion.

Numerous variants of the compositions and methods within the scope of our invention described above will be apparent to one skilled in the art.

We claim:

1. A composition useful for priming porous surfaces comprising a thermoplastic polyester resin
   characterized physically by a melting point in the range of 100°–120°C, a viscosity in 35 percent ammoniacal solution of about 30–50 cps, solubility at alkaline pH, solubility in alkanols having 1 to 4 carbon atoms, and characterized chemically as the polymerization product of trimellitic anhydride and isophthalic acid in a molar ratio of about 4–8 to 1, a glycol having 3 to 6 carbon atoms in an amount of 0.7 to 1.2 moles per mole of trimellitic anhydride, and an alkanol having 6 to 16 carbon atoms in an amount sufficient to impart to the resin an acid number of about 190–210;

dissolved in a lower alkanol having 1 to 4 carbon atoms, the weight ratio of said lower alkanol to said resin being in the range of 0.5-4 to 1, and having dispersed therein 5 to 60 percent by weight of at least one pigment; the pH of said composition being in the range of 3 to 6.5.

2. A composition according to claim 1 wherein said alkanol is tridecanol.

3. A composition according to claim 1 wherein said glycol is 2,2-dimethylpropane-1,3-diol.

4. A composition according to claim 1 wherein said lower alkanol is ethanol.

5. A composition according to claim 2 wherein said glycol is 2,2-dimethylpropane-1,3-diol and said lower alkanol is ethanol.

6. A composition according to claim 4 wherein said weight ratio of lower alkanol to resin is about 2.4 to 1.

7. A composition according to claim 1 wherein the pigment includes titanium dioxide.

8. A composition according to claim 4 wherein the pigment is present in an amount of about 34 percent by weight.

9. A composition according to claim 1 wherein the pigment includes talc.

10. A composition according to claim 5 wherein the pigment comprises titanium dioxide and talc in a weight ratio of about 2–3 to 1.

11. The method of finishing a porous surface comprising first applying thereto a thin coat of a primer composition comprising a thermoplastic polyester resin
    characterized physically by a melting point in the range of 100°–120°C, a viscosity in 35 percent ammoniacal solution of about 30–50 cps, solubility at alkaline pH, solubility in alkanols having 1 to 4 carbon atoms and characterized chemically as the polymerization product of trimellitic anhydride and isophthalic acid in a molar ratio of about 4–8 to 1; a glycol having 3 to 6 carbon atoms in an amount of 0.7 to 1.2 moles per mole of trimellitic anhydride and an alkanol having 6 to 16 carbon atoms in an amount sufficient to impart to the resin an acid number of about 190–210;

dissolved in a lower alkanol having 1 to 4 carbon atoms, the weight ratio of such alkanol to said resin being in the range of 0.5–4 to 1, and having dispersed therein 5 to 60 percent by weight of at least one pigment; the pH of said composition being in the range of 3 to 6.5, drying said applied primer composition and then applying to said primed surface a thin layer of a finish coat.

12. A method according to claim 11 wherein said alkanol is tridecanol.

13. A method according to claim 11 wherein said glycol is 2,2-dimethylpropane-1,3-diol.

14. A method according to claim 11 wherein said lower alkanol is ethanol.

15. A method according to claim 12 wherein said glycol is 2,2-dimethylpropane-1,3-diol and said lower alkanol is ethanol.

16. A method according to claim 14 wherein said weight ratio of lower alkanol to resin is about 2.4 to 1.

17. A method according to claim 11 wherein the pigment includes titanium dioxide.

18. A method according to claim 11 wherein the pigment includes talc.

19. A method according to claim 14 wherein said pigment is present in an amount of about 34 percent by weight.

20. A method according to claim 11 wherein said porous surface is wood.

* * * * *